UNITED STATES PATENT OFFICE.

GEORG MERLING AND HUGO KÖHLER, OF ELBERFELD, GERMANY, ASSIGNORS TO FARBENFABRIKEN VORM. FRIEDR. BAYER & CO., OF ELBERFELD, GERMANY, A CORPORATION OF GERMANY.

PROCESS OF PRODUCING ISOPRENE.

1,056,815. Specification of Letters Patent. Patented Mar. 25, 1913.

No Drawing. Application filed December 6, 1911. Serial No. 664,137.

*To all whom it may concern:*

Be it known that we, GEORG MERLING and HUGO KÖHLER, doctors of philosophy, chemists, citizens of the German Empire, residing at Elberfeld, Germany, have invented new and useful Improvements in Processes of Producing Isoprene, of which the following is a specification.

We have found that isoprene can be obtained by distilling with an alkali such as caustic alkali, or an earth alkali, the halogen ammonium halogenids of the formulæ:

$$CH_3-CH-CH(CH_3)-CH_2-\text{halogen}$$
$$|\quad\quad N(CH_3)_3\cdot\text{halogen}$$

and $$CH_3-CH-CH-CH_2-N(CH_3)_3$$
$$|\quad\quad |$$
$$\text{halogen}\quad\text{halogen}$$

In order to illustrate the new process more fully the following examples are given, the parts being by weight:

*Example 1—Manufacture and production of isoprene from the tetra-ammonium-chlorid:*

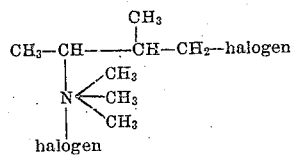

1 part of the ammonium chlorid which can be easily obtained according to the well known methods and which is a colorless, deliquescent crystal mass is dissolved in about 5 parts of water. The solution while being cooled with ice is saturated with hydrobromic acid and is heated for 24 hours in an autoclave in a boiling water bath. When the solution is evaporated on the water bath or after the water and the superfluous hydrobromic acid is separated in another suitable manner the bromin ammonium chlorid:

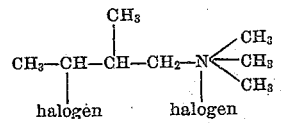

remains as a viscous brown syrup. This syrup is distilled with about three times its quantity of pulverized caustic potash or caustic soda or with calcium or barium hydroxid with or without the addition of alcohol or water. The isoprene distils over. It is collected in a receiver cooled with ice, separated from the trimethylamin by washing it with diluted sulfuric acid, dried and distilled. It boils constantly at from 34–35° C. The yield is nearly a theoretical one. The same result can be obtained by saturating the aqueous solution of 1 part of the above mentioned oxyammonium chlorid in 5 to 6 parts of water with hydrochloric acid at a temperature of about 0° C.; the solution is heated for 24 to 48 hours to from 120–130° C. and after being cooled a dark resinous substance is filtered off and the filtrate evaporated on the water bath. The chloro-ammonium-chlorid:

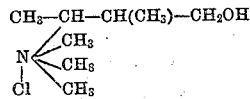

remains as a viscous brown syrup which when heated with concentrated alkali lye or with pulverized caustic potash or with calcium or barium hydroxid is decomposed into hydrochloric acid, trimethylamin and isoprene which latter is separated and purified as above mentioned.

*Example 2—Manufacture and production of isoprene from the tetra-ammonium chlorid:*

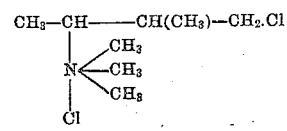

The ammonium chlorid which can be obtained by directly combining the oxy base:

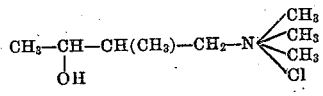

with methyl chlorid or by converting the ammonium iodid thereof (melting point 145–146° C.) with silver chlorid is a colorless, deliquescent crystal mass. It is dissolved in about 5 parts of water and the well cooled solution is saturated with hydrobromic acid or hydrochloric acid, and heated in an autoclave on the boiling water bath for about 24 hours. When the clear solution is evaporated on the water bath or the water and the superfluous hydrogen halid is separated in another suitable manner, the bromo- or chloro-ammonium chlorid:

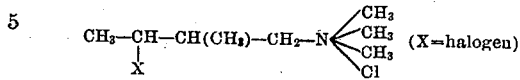 (X=halogen)

remains as a thick brown syrup, which is distilled with about three times its quantity of pulverized caustic potash or soda or also with calcium or barium hydroxid with or without the addition of alcohol or water. The isoprene distils over, it is collected in a tube, cooled with ice, separated from trimethylamin by washing it with diluted sulfuric acid, dried and distilled. It boils constantly at 34° C. The yield is nearly theoretical.

We claim:—

1. The process of producing isoprene from a halogen ammonium halogenid containing the following graphically represented nucleus:

which comprises heating such halogenid with an alkali.

2. The process for producing isoprene, which process consists in first heating with an alkali a halogen-ammonium halogenid having the hydrocarbon radical:

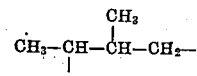

and secondly isolating the isoprene from the resulting mixture, substantially as described.

3. The process for producing isoprene, which process consists in first heating with an alkali a halogen-ammonium-halogenid of the formula:

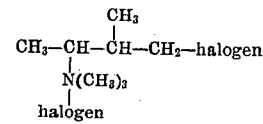

and secondly isolating the isoprene from the resulting mixture, substantially as described.

In testimony whereof we have hereunto set our hands in the presence of two subscribing witnesses.

GEORG MERLING. [L. S.]
HUGO KÖHLER. [L. S.]

Witnesses:
HELEN NUFER,
A. NUFER.